United States Patent [19]

Hazelrigg

[11] 4,426,104

[45] Jan. 17, 1984

[54] UNDERWATER CONNECTOR APPARATUS

[75] Inventor: Keith R. Hazelrigg, Houston, Tex.

[73] Assignee: NL Industries, Inc., New York, N.Y.

[21] Appl. No.: 313,282

[22] Filed: Oct. 21, 1981

[51] Int. Cl.³ .................... F16L 35/00; F16L 55/00; F16L 39/00; F16L 37/00
[52] U.S. Cl. ............................ 285/26; 285/27; 285/87; 285/137 R; 285/310; 285/313
[58] Field of Search .................. 285/25–29, 285/87, 137 R, 309, 310, 313

[56] References Cited

U.S. PATENT DOCUMENTS

| | | |
|---|---|---|
| 483,987 | 10/1892 | Balbian . |
| 1,865,462 | 7/1932 | Etnyre ........................ 285/27 X |
| 2,183,895 | 12/1939 | Reed . |
| 2,451,437 | 10/1948 | Fenlon ....................... 285/309 X |
| 3,214,195 | 10/1965 | Zahuranec et al. ............ 285/27 |
| 3,918,485 | 11/1975 | Weber . |
| 4,105,046 | 8/1978 | Sturgis . |

Primary Examiner—Richard J. Scanlan, Jr.

Attorney, Agent, or Firm—Browning, Bushman, Zamecki & Anderson

[57] ABSTRACT

Apparatus for making up underwater fluid connections comprising first and second connector assemblies each comprising at least one conduit connector member, the connector members of the two assemblies being matably connectable by movement of the assemblies toward each other. A pair of levers carried by the first assembly are pivotable about a first axis transverse to the direction of movement in connecting the two assemblies, the two levers further being generally parallel and spaced apart along said first axis. The levers have force transmitting arms engageable with the second assembly to urge it toward the first assembly, and are interconnected for joint pivotal movement. The levers have a terminal position engaged with the second assembly when the connector members are connected, and lock bars carried by the first assembly retain the levers in the terminal position. The levers, lock bars, and second assembly are interconnected in the terminal position such that attempted movement of the assemblies away from each other tightens the engagement between the lock bars and the levers.

25 Claims, 6 Drawing Figures

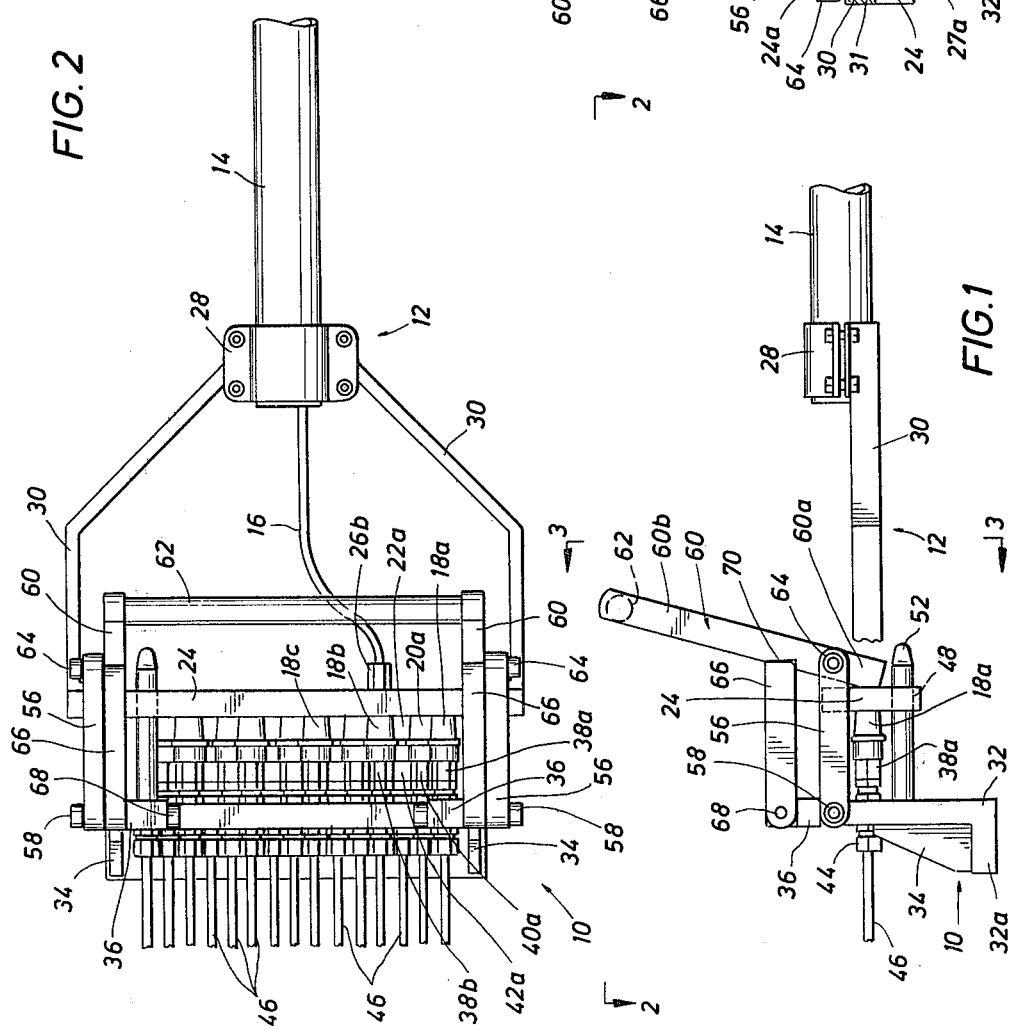

UNDERWATER CONNECTOR APPARATUS

BACKGROUND OF THE INVENTION

The present invention pertains to apparatus for making up hydraulic or other fluid connections under water, typically in connection with an oil or gas well. Such connections are customarily made up by divers. It can be readily appreciated that manipulation of the equipment itself and/or any necessary tools is rendered much more difficult by the fact that these tasks are being performed under water. The deeper the installation site, and the more protective gear which must be worn by the diver, the more difficult such manipulations become. The work is further complicated by the fact that it is often desirable to make up a number of such connections ganged on a single pair of junction plates, so that all of the individual pairs of connectors must be properly aligned and mated when the two plates themselves are connected.

In the past, a typical means of connecting two such junction plates was by means of screw type swing bolts. This system has several disadvantages: not only was it necessary for the diver to use separate tools to make up the connections, but it was further virtually impossible to apply substantially equal forces on opposite sides of the apparatus.

Other systems have been devised wherein the coupling means are entirely carried by the conduits or junction plates to be connected, thereby eliminating the need for separate tools. Examples of such systems are shown in U.S. Pat. No. 2,183,895 to Reed, U.S. Pat. No. 483,987 to Balbian, U.S. Pat. No. 4,105,046 to Sturgis, U.S. Pat. No. 3,214,195 to Zahuranec, et.al., and U.S. Pat. No. 3,918,485 to Weber, et. al. However, these types of connection systems still pose problems, particularly if considered for application to deep underwater use. The first four prior patents listed above are not designed for underwater oilfield-related use, and generally do not fulfill all the requirements for such service. For example, it is possible for these devices to be accidentally disconnected and/or deliberately disconnected while the conduits thereof are still under pressure, either of which would present a wasteful and hazardous situation if it were attempted to adapt these types of coupling systems for deep underwater well-related service. Some of these devices also suffer from the same disadvantages as the screw type swing bolt couplings described above in that they do not insure the application of equal forces on opposite sides of the apparatus. The fifth patent to Weber, et. al., is intended for underwater use. However, it still involves some of the same problems as the prior art discussed above, and in addition, is more mechanically complicated than is desirable.

SUMMARY OF THE INVENTION

The present invention comprises apparatus specifically designed for making up fluid connections underwater. The apparatus includes a pair of connector assemblies with self-contained coupling mechanisms which require no separate tools for operation. The coupling mechanisms are simple both in structure and operation, whereby cost is minimized, danger of breakage or malfunction of the coupling mechanism is largely eliminated, and the apparatus is rendered capable of very easy operation or manipulation by a diver. Nevertheless, the apparatus, while relatively simple, is highly effective in insuring proper alignment and mating connection of multiple pairs of fluid connectors, balancing of the forces exerted on opposite sides of the apparatus, and prevention of accidental disconnection as well as disconnection under pressure.

More specifically, the apparatus includes first and second connector assemblies. Each of these assemblies includes at least one fluid conduit connector member, although the invention is particularly valuable as incorporated into assemblies including ganged connectors. The conduit connector members of the two assemblies are matably connectible by movement of the assemblies toward each other in a first directional mode. A make up or coupling means carried by the first assembly includes a lever system comprising a pair of lever members pivotable about a first axis transverse to said first directional mode of movement. The two lever members are generally parallel to each other and spaced apart along their pivot axis. The lever members are interconnected for joint pivotal movement and have respective force transmitting arms engageable with the second assembly to urge it toward the first assembly to make up the fluid connections. This spacing and interconnection of the lever members helps to insure balanced forces on both sides of the apparatus and proper mating connections of all pairs of connector members on the apparatus.

The lever members have a terminal position in which the force transmitting arms thereof abut an engagement formation on the second assembly, with the connector members matingly engaged. Lock means carried by the first assembly are selectively engageable with the lever members to retain them in their terminal position and thereby lock the apparatus in a connected condition wherein the individual pairs of connector pairs are matingly engaged. Furthermore, the make up means, lock means, and second connector assembly are interconnected in the terminal position such that attempted movement of the assemblies away from each other in a second directional mode opposite the first mode tightens the engagement between the lock means and the lever members. Thus the lock means not only prevents accidental disengagment, but since the pressure of the fluid in the conduits coupled by the apparatus would normally tend to separate the two assemblies, i.e. to move them in the second directional mode, prevents disengagement at any time when these conduits are under pressure.

To further facilitate operation of the apparatus, particularly where it includes ganged connector members, said connector members are preferably of the quick-disconnect type and are arranged in rows parallel to the pivot axis of the lever members, the connector members in different rows being offset from one another. This makes it possible for the operator, when in proper position for operating the make up means, to determine at a glance whether or not all pairs of connector members are being properly aligned and connected. To further insure proper alignment, the apparatus is provided with guide means cooperative between the two assemblies during the aforementioned movement in the first directional mode.

Accordingly, it is a principal object of the present invention to provide an improved apparatus for making up fluid connections, particularly adapted for use underwater.

Another object of the present invention is to provide such apparatus including an improved self-contained make up or coupling means which requires neither separate tools nor complicated movements on the part of the operator.

Still another object of the present invention is to provide such apparatus which applies balanced forces to opposite sides thereof.

A further object of the present invention is to provide such apparatus with means for automatically preventing disengagement while the fluid lines are under pressure.

Yet another object of the present invention is to provide such apparatus with improved means for facilitating proper alignment and mating connection of a plurality of ganged conduit connector members.

Still other objects, features, and advantages of the present invention will be made apparent by the following detailed description, the drawings, and the claims.

BRIEF DESCRIPTION OF THE DRAWINGS

FIG. 1 is a side elevational view of apparatus according to the present invention in coupled and locked position, with parts broken away for clarity of illustration.

FIG. 2 is a top plan view taken along the line 2—2 in FIG. 1.

FIG. 3 is a transverse view taken along the line 3—3 in FIG. 1.

DETAILED DESCRIPTION

Figure 4:
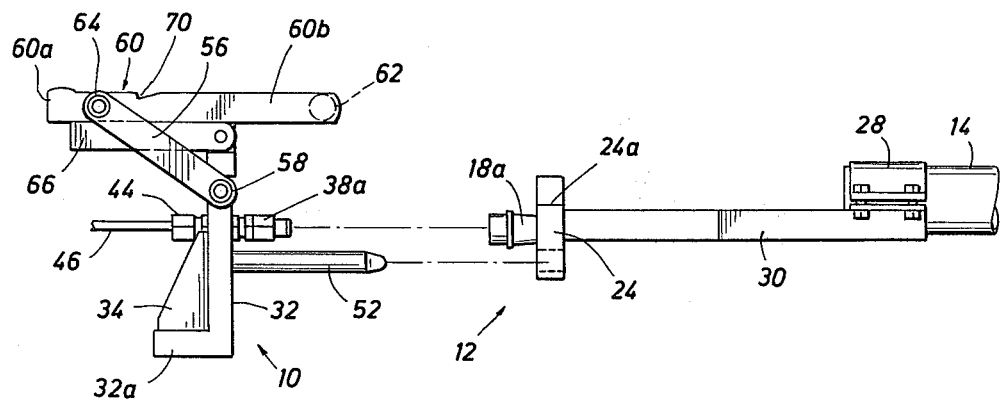
FIGS. 4, 5 and 6 are views similar to that of FIG. 1 showing the apparatus in successive stages of the coupling operation, leading to the completely coupled and locked position shown in FIG. 1.

Referring to the drawings, there is shown a preferred embodiment of the invention which includes first and second connector assemblies 10 and 12 respectively. For convenience, assembly 10 will be referred to herein as the "male assembly," while assembly 12 will be referred to as the "female assembly." However, it should be understood that these designations are somewhat arbitrary, as either of the two assemblies could carry either the male or female portions of the guide means, to be described below, and/or either male or female connector members, also described below. Therefore, the terms should not be construed in a limiting sense. The male assembley 10 is designed to be preinstalled at the underwater well site, and the female assembly 12 is adapted to be connected to assembly 10 by a diver. Assembly 12 includes a heavy tubular protective sheath 14 which encases a plurality of hydraulic lines or conduits, one of which is shown at 16 in FIG. 2. The conduits 16 extend from the forward end of sheath 14, each conduit terminating in a respective female connector member of the quick disconnect type.

Conduit 16 is connected to connector member 18b. For simplicity, not all of the female connector members visible in FIG. 2 have been given reference numerals. However, exemplary female connector members have been denoted by the numerals 18a, 18c, 20a, and 22a. All of the female connector members are mounted on the junction plate 24 of female assembly 12, in an array to be described more fully below, and are connected to their respective hydraulic conduits by fittings such as the one shown at 26b.

For purposes of the present discussion, the direction generally parallel to sheath 14 as viewed in the drawings will be considered the longitudinal dimension of the apparatus. Thus it can be seen that junction plate 24 is oriented transverse to such longitudinal dimension or direction. Junction plate 24 is connected to sheath 14 by a rigid yoke-like structure including a clamp assembly 28, grippingly connected to the forward end of sheath 14, and handle members 30. Each of the handle members 30 is rigidly attached to junction plate 24 by bolt 31 and extends rearwardly from junction plate 24 and then further rearwardly as well as laterally inwardly to clamp assembly 28. Handles 30 may be formed integrally with the lower half of the clamp assembly 28, as shown in the drawings, or may be rigidly attached thereto. Handles 30 and clamp assembly 28 provide a rigid connection between junction plate 24 and sheath 14 which prevent the application of forces to the fluid conduits such as 16. Handles 30 further provide a simple and inexpensive structure which can be easily gripped by the diver for manipulating assembly 12, while the lateral spacing of handles 30 permit the diver to view virtually all parts of the apparatus when looking down upon it. Plate 24 is cut away at its upper corners, as indicated at 24a, for a purpose to be described more fully below.

The portions of assemblies 10 and 12 which face each other when the assemblies are in proper position for beginning the connection procedure, as shown in FIG. 4, will be considered their "forward" portions, and the opposite portions will be considered the "rearward" portions.

The male assembly 10 also comprises a junction plate, which as viewed from the side in FIG. 1, has a reversed L configuration. More specifically, the junction plate of the male assembly comprises a generally upwardly extending leg 32 and a flouge 32a extending rearwardly from the lower end of leg 32. The portions 32 and 32a of the plate are reinforced with respect to each other by gussets 34. Junction plate 32, 32a and gussets 34 define a portion of the overall base structure for male assembly 10, said base structure further including a pair of lugs 36 integrally connected to and extending upwardly from the upper end of plate 32 generally at opposite sides thereof.

The male assembly 10, in addition to the base structure described above, includes a number of other parts carried by that base structure. These include a plurality of male quick-disconnect type fittings, examples of which are shown at 38a, 38b, 40a, and 42a. Each of the male quick-disconnect type connector members is mounted in junction plate 32 by means of a fitting, one example of which is shown at 44, these fittings also serving to interconnect each of the male connector members with a respective hydraulic line or conduit 46. The male connector members 38a et seq. are arranged in the same pattern as the female connector members 18a et seq. so that, if assemblies 10 and 12 are moved toward each other in a generally lengthwise direction, i.e. in what will be referred to herein as the "first directional mode," each of the female connector members may be matably connected to a respective one of the male connector members, such connections being made up simultaneously. To assist the operator in properly aligning the various pairs of matable connector members during such procedure, guide means are provided in the form of bores 48 and 50 extending through junction plate 24 of the female connector assembly generally adjacent diametrically opposed corners thereof and pins 52 and 54 mounted on plate 32 of the male assembly and extending forward therefrom for engagement in respective bores 48 and 50.

The base structure of male assembly 10 also carries a make up or coupler subassembly. The make up assembly includes a pair of parallel carrier bars 56 each of which is pivotally mounted on a respective one of the laterally outer sides of plate 32 by a respective pivot pin 58.

Pins 58 define a pivot axis which extends transverse to the lengthwise dimension of the apparatus in general, i.e. transverse to the first directional mode in which the assemblies are moved in order to make up the connection, said axis further being oriented parallel to junction plates 24 and 32. It can also be seen that carrier bars 56 are spaced apart along their pivot axis. The make up assembly further includes a pair of lever members 60 each of which is pivotally connected to the laterally inner side of a respective one of the carrier bars 56 at the end of the carrier bar opposite pivot pin 58 by an additional pivot pin 64. Pins 64 define a second pivot axis, parallel to the first axis defined by pins 58. This second axis intersects the levers 60 intermediate their ends so that each lever member defines a relatively short force transmitting arm 60a and a relatively long force receiving arm 60b. The outboard ends of force receiving arms 60b are rigidly interconnected by a handle 62 for joint pivotal movement about the axis defined by pins 64. Finally, the base structure of assembly 10 carries lock means in the form of a pair of lock bars 66 each having one end pivotally connected to a respective one of the lugs 36 by a respective pin 68, the pins 68 defining a third axis parallel to the first two axes.

Referring now especially to FIGS. 4, 5, 6 and 1, the sequence of operation in completely making up a set of ganged hydraulic connections by means of the apparatus of the invention will be described. FIG. 4 shows the apparatus in a preferred starting position. On the male assembly 10, the lock bars 66 have been pivoted rearwardly as far as possible so that they lie in a generally horizontal position. The carrier bars 56 have also been pivoted rearwardly. Lever members 60 have been pivoted to a horizontal position generally overlying respective lock bars 66 with their force receiving arms 60b forward. This places the make up and lock means in positions where they will not interfere with initial alignment of female assembly 12 with male assembly 10, while leaving handle 62 in a convenient position to be grasped by the operator. With the parts in the position of FIG. 4, the diver or operator would grasp handles 30 and begin moving female assembly 12 toward male assembly 10, i.e. moving the assemblies together in the first directional mode. Pins 52 and 54 would be directed into respective bores 48 and 50 to guide the various pairs of connector members, e.g. 18a and 38a, into proper matable alignment.

Figure 5:
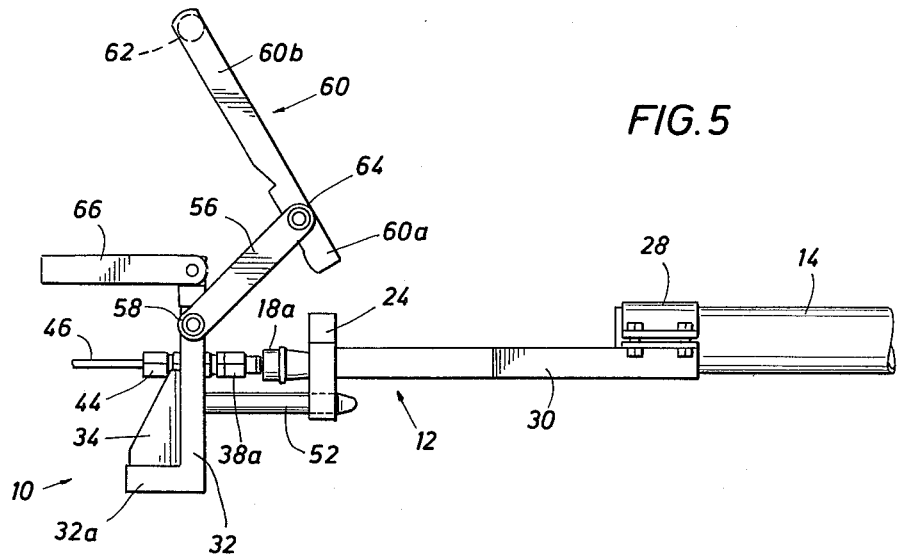
Figure 6:
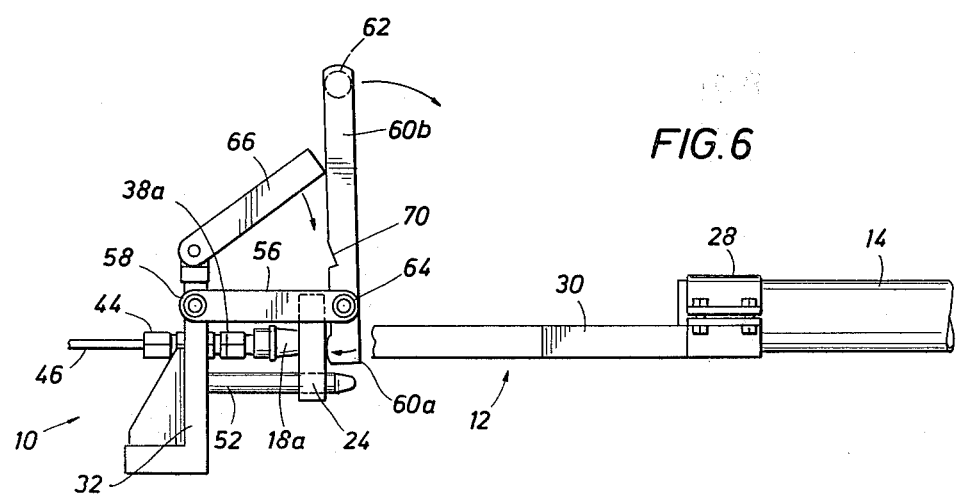

When assembly 12 has been thus brought into close proximity with assembly 10, as shown in FIG. 5, the operator would then grasp handle 62 and raise it thereby pivoting lever members 60 into a generally vertical position. By continuing to pivot lever members 60 in the same general direction, the operator would then tilt the handle 62 and adjacent ends of lever members 60 slightly rearwardly from pivot pins 64. Then, by pulling forward on handles 62, while maintaining lever members 60 in the same generally tilted position last described, the attached ends of carrier bars 56 would be moved forward, pivoting on pins 58, as shown in FIG. 5. This brings the lever members 60 generally closer to junction plate 24 as shown in FIG. 5. By continuing this same mode of movement, the force transmitting arms 60a of lever members 60 are brought into overlapping relation with junction plate 24 of the female assembly 12, the rear surfaces of force transmitting arms 60a abutting the rear surface of plate 24. This position is shown in FIG. 6. Cut away areas 24a in plate 24 permit the necessary movement of bars 56 to this position. Finally, by pulling forward on handle 62 and pivoting the lever members 60 about their pins 64, lever members 60 will force junction plate 24 closer to junction plate 32, i.e. to the position shown in FIG. 1, so as to fully matably connect the various pairs of connector members such as 18a and 38a. The position illustrated in FIG. 1 is referred to herein as the "terminal position" of lever members 60 and the apparatus in general.

At any time after the make up means 56, 60, 62 has been brought generally into the position indicated in FIG. 6, lock bars 66 can be pivoted forward, as also shown in FIG. 6. Then, when lever members 60 are moved from the position of FIG. 6 to the position of FIG. 1 to complete the connection procedure, the free ends of lock bars 66 will fall by virtue of their own weight into notches 70 on respective ones of the force receiving arms 60b of the lever members. If, for any reason, bars 66 do not fall into place, they can be manually placed in the position shown in FIG. 1.

Because the force transmitting arms 60a abut the rear surface of junction plate 24, the connector members 18a et seq. in turn being disposed on the opposite side of plate 24, said force transmitting arms 60a would have to move away from the rear surface of plate 24 in order for the two connector assemblies to be disengaged. This in turn would require pivoting of the force receiving arms 60b in a rearward direction with respect to the male assembly 10. However, since lock bars 66 abut force receiving arms 60b on the same sides (i.e. rear sides) of the lever members 60 in general as are engaged with plate 24, such movement is prevented by arms 66. Accordingly, arms 66 lock the apparatus in its connected condition so that it cannot be accidentally disengaged, e.g. by jarring of arms 60b or handle 62. Bars 66 are particularly difficult to accidentally dislodge because they lie in a generally horizontal position and can be unlocked only by upward movement of their free ends. Furthermore, once pressurized fluid is permitted to flow through the conduits 16 and 46 connected by the apparatus, such pressure naturally tends to push assemblies 10 and 12 away from each other, i.e. in a second longitudinal directional mode opposite to the first mode described above. However, any tendency to such movement will urge plate 24 more tightly against force transmitting arms 60a of lever members 60 tending to pivot force receiving arms 60b rearwardly.

However, such attempted movement by arms 60b only urges them into tighter engagement against lock arms 66. For this reason, the very pressure against which the assemblies must be locked together is used to tighten the lock means, and it is virtually impossible to disconnect the two assemblies 10 and 12 while the hydraulic lines thus connected are under pressure. This represents an important safety feature of the apparatus of the present invention.

Referring again to FIG. 3, the fittings 26a–26e, 27a–27e, and 29a–29e, and accordingly the respective attached female connector members 18a et seq., are arranged in three rows parallel to the pivot axes of the make up and lock means described above. As further shown in FIG. 3, the fittings 26a –29e, and thus the respective attached female connector members, in different rows are offset from one another. This makes it possible for an operator who is grasping handles 30, one in each hand, whereby he can conveniently view the area generally between those handles, to observe virtually all of the pairs of male and female connector members to be sure that all are being properly aligned and matably engaged. FIG. 2 generally represents the view of the operator in such a position. It should be noted, for example, that the first pair of connectors 18a and 38a in the upper row does not obscure the view of the first pair of connectors 20a and 40a in the second row, nor do either of these pairs of connectors obscure the view of the first pair of connectors 22a and 42a in the lower row. The same general pattern is repeated for all pairs of connectors. The fact that no two pairs of mated connectors are vertically aligned also facilitates the location of any leak which may develop by observation of bubbles rising from the leaking pair of connectors.

From the foregoing, it can be seen that the apparatus of the present invention provides a convenient means by which a diver can accurately make up ganged fluid connections by a few relatively simple movements which can easily be performed without the need for either threading type movements nor the use of separate tools. The interconnection of the lever members by which the two assemblies are finally urged into their fully connected positions helps to insure the application of equal or balanced forces on both sides of the apparatus. Proper alignment of various pairs of connector members is insured by the guide means as well as the offsetting of the connector members in different rows. The lock means, as explained above, prevent accidental dislodgement or disengagement of the apparatus and also make it impossible to separate the connector assemblies without first shutting off the communication of the connected conduits with pressurized fluid. Additionally, because the lever members 60 are interconnected for joint pivotal movement while the lock bars 66 are independently movable, if one of the lock bars should break or be damaged, the other will still serve to lock the entire apparatus in its connected condition.

The foregoing description represents only one preferred embodiment of the invention, and it should be understood that numerous modifications could be made within the spirit of the invention. Accordingly, it is intended that the scope of the present invention be limited only by the claims which follow.

I claim:

1. Apparatus for making up underwater fluid connections comprising:
   first and second connector assemblies, said second assembly having engagement formation means, and each of said assemblies comprising at least one conduit connector member, said connector members being matably connectable by movement of said assemblies toward each other in a first directional mode;
   lever means carried by said first assembly and comprising a pair of lever members pivotable about a first axis transverse to said first directional mode of movement, said lever members being generally parallel and spaced apart along said first axis and having force transmitting arms engageable with said engagement formation means of said second assembly to urge said second assembly toward said first assembly in said first directional mode, and force receiving arms extending from said first axis generally in the opposite direction from said force transmitting arms, wherein said lever members have a terminal position with said force transmitting arms abutting said engagement formation means when said connector members are connected, and a releasing position with said force transmitting arms separated from said engagement formation means, said lever means further comprising means interconnecting said lever members for joint pivotal movement;
   and lock means carried by said first assembly and having a locking position abutting at least one of said force receiving arms to prevent movement toward said releasing position for retaining said lever members in said terminal position.

2. The apparatus of claim 1 wherein said apparatus further comprises carrier means connecting said lever members to said first assembly for movement toward and away from said engagement formation means.

3. The apparatus of claim 2 wherein said lever members are pivotally connected to said carrier means at said first axis, said carrier means being pivotally connected to said first assembly about a second axis generally parallel to and spaced from said first axis.

4. The apparatus of claim 1 wherein said lock means, said lever members, and said second assembly are interconnected in said terminal position such that attempted movement of said assemblies away from each other in a second directional mode opposite said first mode tightens the engagement between said lock means and said lever members.

5. The apparatus of claim 1 wherein said lock means comprises a pair of lock members each having one end adapted to abut a respective one of said force receiving arms and the other end pivotally connected to said first assembly for movement of said one end away from said force receiving arm.

6. The apparatus of claim 5 wherein said lock members are movable independently of each other.

7. The apparatus of claim 5 wherein said lock members lie generally horizontally and generally parallel to said carrier means in said locking position, and wherein said movement away from said force receiving arms comprises generally upward movement.

8. The apparatus of claim 5 wherein each of said force receiving arms has a notch for receiving said one end of said lock member.

9. The apparatus of claim 1 wherein each of said assemblies comprises a plurality of such conduit conductor members, each matingly connectible with a respective one of the connector members of the other assembly.

10. The apparatus of claim 9 further comprising guide means cooperative between said assemblies for aligning mating connector members during movement in said first directional mode.

11. The apparatus of claim 9 wherein said connector members of each of said assemblies are arranged in rows generally parallel to said first axis, the connector members in different rows being offset from one another.

12. The apparatus of claim 9 wherein said connector members are of the quick-disconnect type.

13. Apparatus for making up underwater fluid connections comprising:
   first and second conductor assemblies, each of said assemblies comprising at least one conduit connector member, said connector members being matably connectable by movement of said assemblies toward each other in a first directional mode;

make up means carried by said first assembly and engageable with said second assembly to urge said second assembly toward said first assembly in said first directional mode, said make up means having a terminal position engaged with said second assembly when said connector members are connected;

lock means carried by said first assembly and engageable with said make up means for retaining said make up means in said terminal position;

said make up means, said lock means, and said second assembly being interconnected in said terminal position such that attempted movement of said assemblies away from each other in a second directional mode opposite said first mode tightens the engagement between said lock means and said make up means.

14. Apparatus for making up underwater fluid connections comprising:

first and second connector assemblies, each of said assemblies comprising at least one conduit connector member, said connector members being matably connectable by movement of said assemblies toward each other in a first directional mode, said second assembly comprising engagement formation means defining an abutment surface facing oppositely from the connector member of said second assembly;

make up means carried by said first assembly and engageable with said second assembly to urge said second assembly toward said first assembly in said first directional mode, said make up means having a terminal position engaged with said second assembly when said connector members are connected and comprising at least one lever having a force transmitting arm abutting said abutment surface in said terminal position and pivotally movable about a first axis to a releasing position separated from said abutment surface, said lever further having a force receiving arm extending generally in the opposite direction from said force transmitting arm;

lock means carried by said first assembly for retaining said make up means in said terminal position, said lock means having a locking position abutting said force receiving arm on the same side of said lever as said abutment surface whereby attempted movement of said assemblies away from each other in a second directional mode opposite said first mode tightens the engagement beween said lock means and said lever.

15. The apparatus of claim 14 further comprising carrier means, said lever being pivotally connected to said carrier means at said first axis, and said carrier means being pivotally connected to said first assembly about a second axis generally parallel to and spaced from said first axis, for movement of said lever, as a whole, generally toward and away from said engagement formation means.

16. The apparatus of claim 15 wherein said lever has a force receiving arm extending from said first axis generally in the opposite direction from said force transmitting arm, said lock means having one end adapted to abut said force receiving arm to prevent movement from said terminal position to said releasing position, and the other end pivotally connected to said first assembly on an axis generally parallel to said first and second axes for movement of said one end toward and away from said force receiving arm.

17. The apparatus of claim 16 wherein said lock means lies generally horizontally in said lock position, and wherein said movement of said one end away from said force receiving arm comprises generally upward movement.

18. The apparatus of claim 17 wherein there are two such levers, and said lock means comprises a pair of independently movable lock members, each engageable with a respective one of said levers.

19. The apparatus of claim 18 wherein the force receiving arm of each of said levers has a notch therein for receiving said one end of the respective one of said lock members.

20. The apparatus of claim 13 wherein each of said assemblies comprises a plurality of such conduit connector members each matably connectible with a respective one of the connector members of the other assembly.

21. The apparatus of claim 20 further comprising guide means, cooperative between said assemblies for aligning mating connector members duriing movement in said first directional mode.

22. The apparatus of claim 20 wherein the connector members of each of said assemblies are arranged in rows, the connector members of different rows being offset from one another.

23. The apparatus of claim 20 wherein said connector members are of the quick-disconnect type.

24. A connector assembly for making up multiple fluid connections comprising:

a base structure;

a plurality of conduit connector members carried by said base structure for mating connection to respective conduit connector members on another connector assembly;

guide means carried by said base structure for aligning the connector members of said assemblies for mating one-to-one engagement;

carrier means pivotally connected to said base structure;

lever means pivotally connected to said carrier means intermediate the ends of said lever means;

and lock means pivotally connected to said base structure generally adjacent said carrier means and having one end movable toward and away from said lever means;

the pivot axes of said lever means, said carrier means, and said lock means all being generally parallel.

25. The apparatus of claim 24 wherein said conduit connector members are of the quick-disconnect type and are arranged in rows, the connector members of different rows being offset from one another.

* * * * *